US006842328B2

United States Patent
Schott et al.

(10) Patent No.: US 6,842,328 B2
(45) Date of Patent: Jan. 11, 2005

(54) CAPACITOR AND METHOD FOR PRODUCING A CAPACITOR

(76) Inventors: Joachim Hossick Schott, 5330 DuPont Ave. South, Minneapolis, MN (US) 55419; Brian Melody, 124 Woody Creek Rd., Greer, SC (US) 29651; John Tony Kinard, 108 Mount Vernon Cir., Greer, SC (US) 29651; John Norton, 2159 Violet La., New Brighton, MN (US) 55112; Mark Viste, 7243 Logan Ave. North, Brooklyn Center, MN (US) 55430; Anthony Rorvick, 10641 Shady Oak Port North, Champlain, MN (US) 55316; Christian Nielsen, 582 Sykora La., River Falls, WI (US) 54022

( * ) Notice: Subject to any disclaimer, the term of this patent is extended or adjusted under 35 U.S.C. 154(b) by 0 days.

(21) Appl. No.: 10/449,879

(22) Filed: May 30, 2003

(65) Prior Publication Data

US 2004/0240144 A1 Dec. 2, 2004

(51) Int. Cl.[7] ................................................. H01G 4/35
(52) U.S. Cl. ....................... 361/302; 361/303; 361/305; 361/502; 361/504; 361/509; 361/512
(58) Field of Search ................................. 361/302, 303, 361/305, 502, 503, 504, 508–509, 512, 516, 520, 523, 528, 530–532, 525

(56) References Cited

U.S. PATENT DOCUMENTS

| | | |
|---|---|---|
| 3,243,316 A | 3/1966 | O'Nan et al. |
| 4,562,511 A | 12/1985 | Nishino et al. |
| 4,780,797 A | 10/1988 | Libby |
| 4,942,500 A | 7/1990 | Libby et al. |
| 5,043,849 A | 8/1991 | Libby |
| 5,098,485 A | 3/1992 | Evans |
| 5,187,788 A | 2/1993 | Marmelstein |
| 5,312,439 A | 5/1994 | Loeb |
| 5,331,579 A | 7/1994 | Maguire, Jr. et al. |
| 5,369,547 A | 11/1994 | Evans |
| 5,469,325 A | 11/1995 | Evans |
| 5,541,863 A | 7/1996 | Magor et al. |
| 5,559,667 A | 9/1996 | Evans |
| 5,671,415 A | 9/1997 | Hossain |
| 5,737,181 A | 4/1998 | Evans |
| 5,754,394 A | 5/1998 | Evans et al. |
| 5,786,980 A | 7/1998 | Evans |
| 5,800,706 A | 9/1998 | Fischer |
| 5,822,177 A | 10/1998 | Popp et al. |
| 5,851,506 A | 12/1998 | Zheng et al. |

(List continued on next page.)

FOREIGN PATENT DOCUMENTS

| | | |
|---|---|---|
| DE | 30 11 701 A1 | 10/1981 |
| DE | 198 36 651 A1 | 2/2000 |
| WO | WO 97/43774 | 11/1997 |
| WO | WO 00/02213 | 1/2000 |

OTHER PUBLICATIONS

B.E. Conway, "The Double Layer and Surface Functionalities at Carbon," Electrochemical Supercapacitors: Scientific Fundamentals and Technological Applications, Chapter 9 (1999) (58 sheets).

(List continued on next page.)

*Primary Examiner*—Anthony Dinkins
*Assistant Examiner*—Nguyen T. Ha
(74) *Attorney, Agent, or Firm*—Foley & Lardner LLP

(57) ABSTRACT

An electrode for a capacitor includes a substrate comprising at least one of glassy carbon and a metal. According to various embodiments, the substrate may be provided as glassy carbon or any of a variety of metals for use in capacitors. The capacitor also includes an activated carbon material adjacent the substrate. The activated carbon layer includes oxygen-containing functional groups. A material is provided in contact with the activated carbon layer for providing enhanced capacitance for the electrode. Various types of capacitance-enhancing materials may be utilized, including carbon nanotubes and conductive metal oxides.

47 Claims, 7 Drawing Sheets

U.S. PATENT DOCUMENTS

| | | | |
|---|---|---|---|
| 5,894,403 | A | 4/1999 | Shah et al. |
| 5,932,185 | A | 8/1999 | Pekala et al. |
| 5,980,977 | A | 11/1999 | Deng et al. |
| 5,982,609 | A | 11/1999 | Evans |
| 5,985,112 | A | 11/1999 | Fischer |
| 6,031,711 | A | 2/2000 | Tennent et al. |
| 6,094,339 | A | 7/2000 | Evans |
| 6,099,960 | A | 8/2000 | Tennent et al. |
| 6,099,965 | A | 8/2000 | Tennent et al. |
| 6,203,814 | B1 | 3/2001 | Fisher et al. |
| 6,205,016 | B1 | 3/2001 | Niu |
| 6,208,502 | B1 | 3/2001 | Hudis et al. |
| 6,221,330 | B1 | 4/2001 | Moy et al. |
| 6,414,836 | B1 | 7/2002 | Tennent et al. |
| 6,419,717 | B2 | 7/2002 | Moy et al. |
| 6,432,866 | B1 | 8/2002 | Tennent et al. |
| 6,491,789 | B2 | 12/2002 | Niu |
| 6,514,897 | B1 | 2/2003 | Moy et al. |
| 2002/0095860 | A1 | 7/2002 | Moy et al. |
| 2002/0171996 | A1 | 11/2002 | Yu et al. |
| 2003/0010407 | A1 * | 1/2003 | Arai ............................ 148/276 |
| 2003/0035769 | A1 | 2/2003 | Moy et al. |
| 2003/0044519 | A1 | 3/2003 | Takai |

OTHER PUBLICATIONS

Trasatti "Properties of Conductive Transition Metal Oxides with Rutile–Type Structure," Chapter 7, Electrodes of Conductive Metallic Oxides Part A., pps. 301–358 (1980) (58 sheets).

Ian R. Ralstrick, "Electrochemical Capacitors," Electrochemistry of Semiconductors and Electronics, Chapter 7, (1992) pps. 297–355, (30 sheets).

Loeb et al., "Injectable microstimulator for functional electrical stimulation," Med.& Biol. Eng. & Comput., 29, NS13–NS19 (1991).

Raistrick, "Electrochemical capacitors" in "Electrochemistry of semiconductors and electronics—processes and devices," eds. John McHardy and Frank Ludwig, Noyes Publications, pp. 297–355 (1992).

Trasatti; et al., "Ruthenium dioxide: a new interesting electrode material," J. Electroanal. Chem., 29, App. 1–5, (1971).

Niu et al., "High power electrochemical capacitors based on carbon nanotube electrodes," Applied Physics Letters 70 (11).

Dresselhaus et al., "Carbon nanotubes," Physics World, pp. 33–38, (Jan. 1998).

Schöenberger et al., "Multiwall carbon nanotubes," Physics World, pp. 37–41 (Jun. 2000).

Li et al., "Highly–ordered carbon nanotube arrays for electronics applications," Applied Physics Letters 73 (3), pp. 367–369, (1999).

Hahn et al., "A 24 V Bipolar Electrochemical Double Layer Capacitor Based on Activated Glassy Carbon," In "Power Sources for the New Millenium," The Electrochemical Society, Inc. Proceedings vol. 2000–22, (5 pages) (2001).

* cited by examiner

CAPACITOR AND METHOD FOR PRODUCING A CAPACITOR

CROSS-REFERENCE TO RELATED PATENT APPLICATIONS

This application is related to Non-Provisional U.S. patent application Ser. No. 10/448,556 entitled "Capacitor and Method for Producing a Capacitor" and Non-Provisional U.S. patent application Ser. No. 10/449,645 entitled "Electrolytic Capacitor", each of which were filed on the same date as the present application.

BACKGROUND OF THE INVENTION

The present invention relates generally to the field of capacitors. More specifically, the present invention relates to electrolytic capacitors for use in a device such as an implantable medical device.

Since their earliest inception, there has been significant advancement in the field of body-implantable electronic medical devices. Today, such implantable devices include therapeutic and diagnostic devices, such as pacemakers, cardioverters, defibrillators, neural stimulators, drug administering devices, and the like for alleviating the adverse effects of various health ailments.

Implantable medical devices may utilize a capacitor to perform various functions. For example, if the implantable medical device is a defibrillator, one or more capacitors may be used to provide a therapeutic high voltage treatment to a patient.

One type of capacitor that may be used in such an application is an electrolytic or wet slug capacitor. Conventional wet slug capacitors may include a container formed from tantalum or a tantalum alloy that acts as the cathode. An electrolyte (e.g., an acid such as phosphoric acid) and an anode are provided within the container. In these types of capacitors, an anodic oxide may be formed on exposed surfaces.

Since the electrolyte is electrically conductive, a conductor-insulator-conductor structure including metal, oxide coating, and electrolyte is present at both the anode and the cathode. Each of these conductor-insulator-conductor structures constitute themselves a capacitor.

In the conventional wet slug capacitor, the anode capacitance is electrically connected in series with the cathode capacitance. The total capacitance $C_{total}$ of the two capacitors $C_{anode}$ and $C_{cathode}$ in series is expressed by the formula $1/C_{total}=1/C_{anode}+1/C_{cathode}$. In order to maximize $C_{total}$, the capacitance $C_{cathode}$ has to be as large as possible.

Although conventional wet slug capacitors having useful capacitances have been produced, there is a desire to increase the energy per unit volume of capacitor anode (i.e., the stored energy density). The energy E stored inside a capacitor may be expressed by the formula $E=\frac{1}{2} C_{total}U^2$, where U is the potential to which the capacitor is charged. Hence, high energy density requirements demand high-capacitance per-unit area cathodes so as to maximize $C_{total}$ and, in turn, E. Conventional capacitor cathode materials (e.g., tantalum), however, may provide a limited capacitance per unit area. For certain applications, it is desirable to provide a capacitor cathode that has a capacitance in the range of approximately 10–20 milliFarads per square centimeter of geometrical surface area.

Accordingly, there is a need to provide an electrode for a capacitor that utilizes a material which enhances the capacitance for the electrode relative to conventional capacitor electrodes (e.g., provides a capacitor electrode having a specific capacitance of greater than approximately 10 milliFarads per square centimeter). It would be desirable to provide a method of producing such an electrode using a method which is relatively simple in terms of the processing involved and that does not adversely affect capacitor performance. There is also a need for an electrode that utilizes a material which produces a relatively smooth and defect-free electrode surface. There is further a need to provide a capacitor that includes at least one electrode that exhibits increased capacitance as compared to conventional capacitor electrodes.

It would be desirable to provide an electrode for a capacitor and a capacitor that provides one or more of these or other advantageous features. Other features and advantages will be made apparent from the present description. The teachings disclosed extend to those embodiments that fall within the scope of the appended claims, regardless of whether they provide one or more of the aforementioned advantages.

SUMMARY OF THE INVENTION

An exemplary embodiment of the invention relates to an electrode for a capacitor. The electrode includes a substrate comprising at least one of glassy carbon and a metal and an activated carbon material adjacent the substrate. The activated carbon layer comprises oxygen-containing functional groups. The electrode also includes a material provided in contact with the activated carbon material for providing enhanced capacitance for the electrode.

Another exemplary embodiment relates to an electrode for an electrolytic capacitor. The electrode includes a substrate comprising at least one of titanium and glassy carbon and a carbonaceous layer adjacent the substrate. The carbonaceous layer includes an activated carbon region and a capacitance-enhancing material provided adjacent the activated carbon region.

Another exemplary embodiment relates to a method of preparing an electrode for a capacitor. The method includes providing a substrate comprising at least one of glassy carbon and a metal and providing a carbonaceous material proximate the substrate. The carbonaceous material includes activated carbon. The method also includes introducing a capacitance-enhancing material adjacent at least a portion of the carbonaceous material.

Another exemplary embodiment relates to an electrode for a capacitor. The electrode comprises a substrate comprising at least one of glassy carbon and a metal and an activated carbon material adjacent the substrate. The electrode also includes carbon nanotubes provided adjacent the activated carbon material. The activated carbon material and the carbon nanotubes provide enhanced capacitance for the electrode.

Another exemplary embodiment relates to an electrode for a capacitor. The electrode includes a substrate comprising at least one of glassy carbon and a metal and an activated carbon material adjacent the substrate, the activated carbon layer. The electrode also includes an electronically conductive metal oxide provided adjacent the activated carbon material. The activated carbon material and the electronically conductive metal oxide provide enhanced capacitance for the electrode.

BRIEF DESCRIPTION OF THE DRAWINGS

The invention will be explained in more detail in the following text with reference to the attached drawings, in which.

DETAILED DESCRIPTION OF THE PREFERRED EMBODIMENTS

With reference to the accompanying FIGURES, the present disclosure relates to capacitors (e.g., electrolytic capacitors) for use in medical devices (e.g., implantable medical devices), methods of producing such capacitors, and medical devices which utilize such capacitors. While the subject matter herein is presented in the context of the use of such capacitors in the field of implantable medical devices, such capacitors may be utilized in alternative applications such as external medical devices or any other devices utilizing a capacitor, as will be appreciated by those of skill in the art who review this disclosure.

Figure 1:
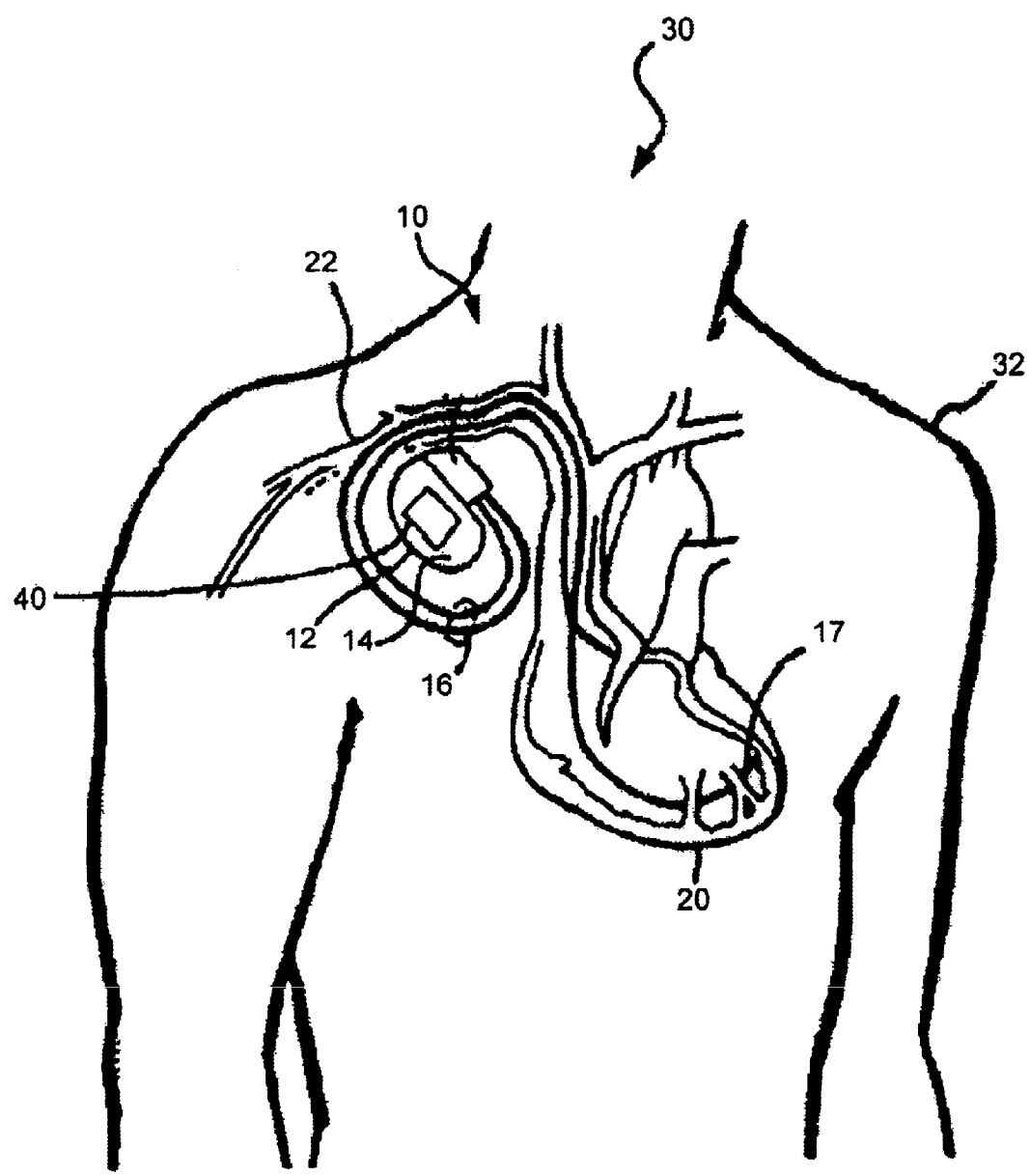
FIG. 1 is a schematic drawing showing an implantable medical device shown in the form of a defibrillator implanted within a human body.

Referring to FIG. 1, a system 10 including an implantable medical device (IMD) is shown as being implanted within a body or torso 32 of a patient 30. The system 10 includes a device 12 in the form of an implantable medical device that for purposes of illustration is shown as a defibrillator. The defibrillator is configured to provide a therapeutic high voltage (e.g., 700 volt) treatment for the patient 30. While the implantable medical device is shown and described as a defibrillator, it should be appreciated that other types of implantable medical devices may be utilized according to alternative embodiments. According to still other alternative embodiments, non-implantable medical devices or other types of devices may utilize capacitors as are shown and described in this disclosure.

The device 12 includes a container or housing 14 that is hermetically sealed and biologically inert according to an exemplary embodiment. The container may be made of a conductive material. One or more leads 16 electrically connect the device 12 and the patient's heart 20 via a vein 22. Electrodes 17 are provided to sense cardiac activity and/or provide an electrical potential to the heart 20. At least a portion of the leads 16 (e.g., an end portion of the leads shown as exposed electrodes 17) may be provided adjacent or in contact with one or more of a ventricle and an atrium of the heart 20.

Figure 2:
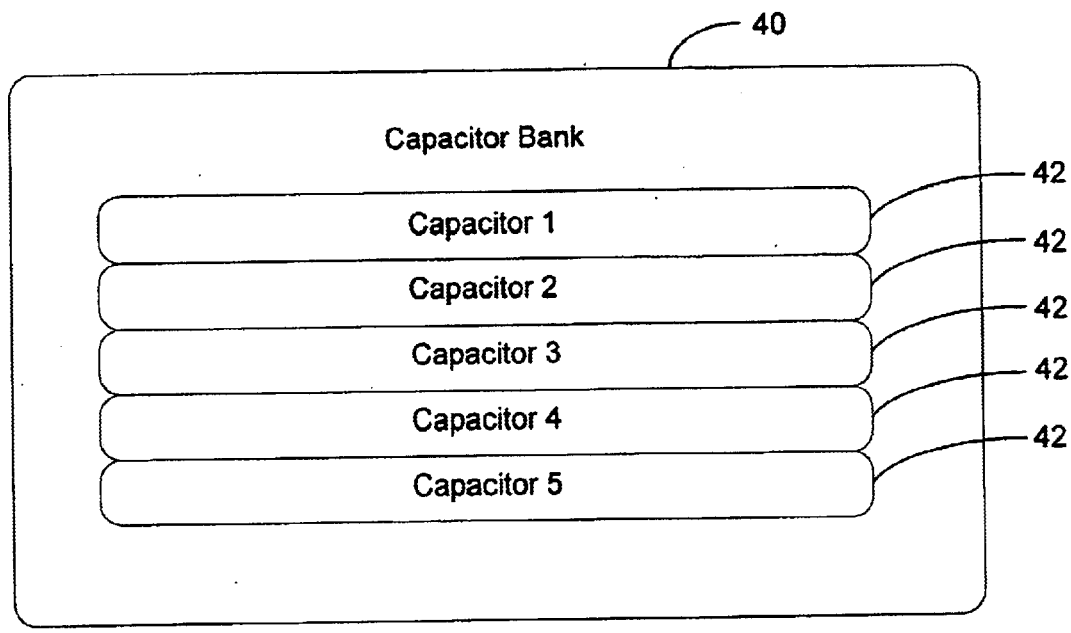
FIG. 2 is a schematic drawing of a capacitor bank that is provided within the implantable medical device shown in FIG. 1.

A capacitor bank 40 including a plurality of capacitors is provided within the device 12. A schematic view of the capacitor bank 40 is shown in FIG. 2, and shows a group of five capacitors 42 connected in series and provided within the capacitor bank. The size and capacity of the capacitors may be chosen based on a number of factors, including the amount of charge required for a given patient's physical or medical characteristics. According to other exemplary embodiments, the capacitor bank may include a different number of capacitors (e.g., less than or greater than five capacitors). According to still other exemplary embodiments, a different number of capacitor banks may be provided within the implantable medical device having any suitable number of capacitors provided therein.

Figure 3:
FIG. 3 is a schematic drawing showing the capacitor bank coupled to a battery.

As shown in FIG. 3, the capacitor bank 40 is coupled to a battery 50. According to an exemplary embodiment, the battery 50 is included within the device 12. According to alternative embodiments, the battery may be provided external to the device 12. The capacitors 42 provided within the capacitor bank are configured to store energy provided by the battery 40. For example, the system 10 may be configured such that when the device 12 determines that a therapeutic high-voltage treatment is required to establish a normal sinus rhythm for the heart 20, the capacitors 42 in the capacitor bank 40 are charged to a predetermined charge level by the battery 50. Charge stored in the capacitors 42 may then be discharged via the leads 16 to the heart 20. According to another exemplary embodiment, the capacitors may be charged prior to determination that a stimulating charge is required by the heart such that the capacitors may be discharged as needed.

Figure 4:
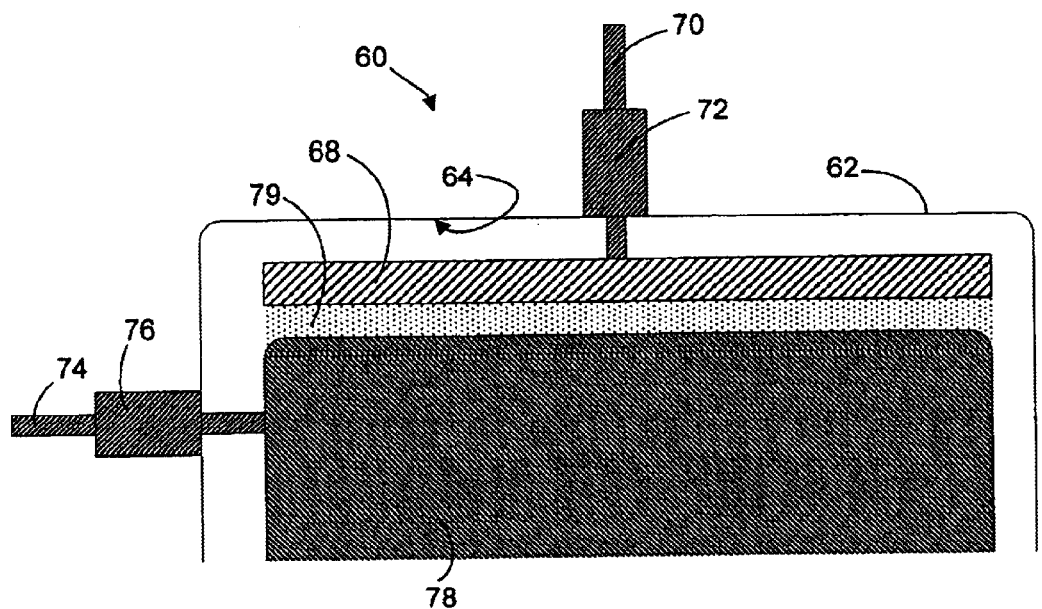
FIG. 4 is a schematic cross-sectional view of a portion of one of the capacitors provided within the capacitor bank shown in FIG. 2 according to an exemplary embodiment.

Various types of capacitors may be provided within the capacitor bank 40 according to various exemplary embodiments. FIG. 4 shows a schematic cross-sectional view of a portion of a capacitor 60 according to a first exemplary embodiment. The capacitor 60 includes a container or housing 62 (e.g., a hermetically sealed container). According to an exemplary embodiment, the container comprises titanium. According to other exemplary embodiments, other materials may be used in place of or in addition to titanium (e.g., tantalum, niobium, zirconium, etc.).

A cathode 68 is provided within the container 62. According to an exemplary embodiment, the cathode 68 is electrically isolated from an inner surface 64 of the container 62. A cathode lead 70 is electrically coupled to the cathode 68 and extends through a wall 66 of the container 62. The cathode lead 70 is electrically isolated from the container 62 by a feed-through 72. According to an exemplary embodiment, the feed-through 72 comprises an insulating material (e.g., glass) that seals the cathode lead 70 from the container 62. The feed-through 72 may also act to prevent material (e.g., electrolyte) from escaping the container 62 and to prevent foreign matter from entering the container 62 in the location of the cathode lead 70.

An anode 78 is provided within the container 62. According to an exemplary embodiment, the anode 78 comprises tantalum. According to other exemplary embodiments, the anode 78 may comprise other materials in addition to or in place of tantalum (e.g., aluminum, titanium, niobium, zirconium, etc.). The anode 78 is provided in the container 62 such that it is not in direct contact with (e.g., is spaced apart from) the cathode 68.

The anode 78 is electrically coupled to an anode lead 74 that passes through a wall 66 of the container 62 via a feed-through 76. The feed-through 76 may be constructed in a similar manner as described with respect to feed-through 72, and may act to electrically isolate the anode lead 74 from the container 62 in substantially the same manner as described with respect to cathode lead 70 and feed-through 72.

An electrolyte 79 (e.g., a fluid or liquid electrolyte) is provided in the container 62. At least a portion of the electrolyte 79 is provided intermediate the cathode 68 and the anode 78. The electrolyte 79 provides negative and positive ions to constitute capacitors at the cathode 68 and the anode 78, respectively. According to an exemplary embodiment, the electrolyte 79 may comprise ammonium salts (e.g., ammonium acetate) dissolved in a water and glycol mixture, phosphoric acid, etc. The particular electrolyte chosen may depend on a number of factors, such as the desired conductivity of the electrolyte.

Figure 5:
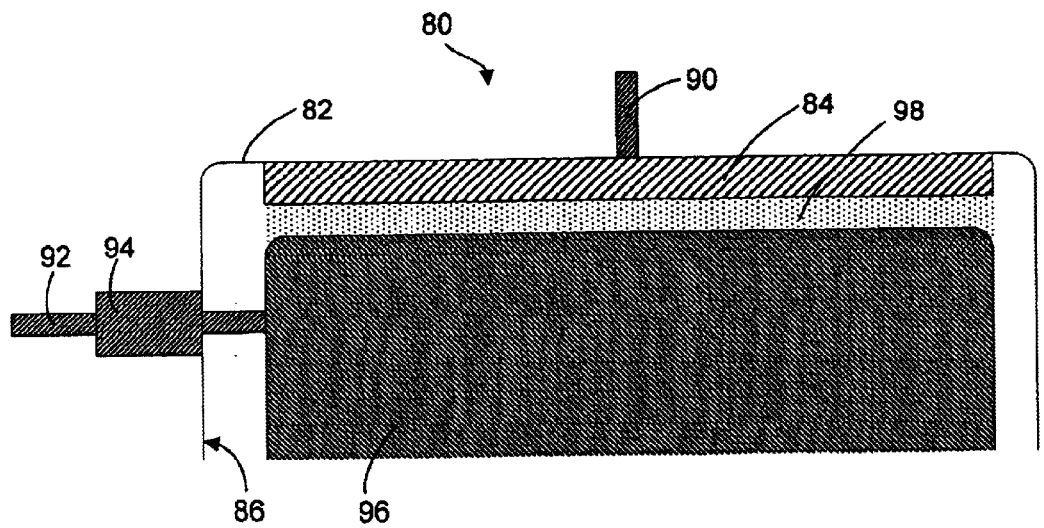
FIG. 5 is a schematic cross-sectional view of a portion of one of the capacitors provided within the capacitor bank shown in FIG. 2 according to another exemplary embodiment.

FIG. 5 shows a cross-sectional schematic view of a portion of a capacitor 80 according to another exemplary embodiment. The capacitor 80 includes a container or housing 82 which may be constructed in a manner similar to that described with respect to container 62.

A cathode 84 is integrally formed with the container 82 such that the cathode 84 forms an inner surface 86 of the container 82. The cathode 84 is electrically coupled to a cathode lead 90 that extends from the wall 88 of the container 82.

An anode 96 is provided within the container 62 such that the anode 96 is not in contact with (e.g., is spaced apart from) the cathode 84. According to an exemplary embodiment, the anode 78 comprises tantalum. According to other exemplary embodiments, the anode 78 may comprise other materials in addition to or in place of tantalum (e.g., aluminum, titanium, niobium, zirconium, etc.).

The anode 96 is electrically coupled to an anode lead 92 through a feed-through 94. The feed-through 94 may be constructed in a similar manner to that described with respect to the feed-through 72 and the feed-through 76.

An electrolyte 98 (e.g., a fluid or liquid electrolyte) is provided in the container 82. At least a portion of the electrolyte 98 is provided intermediate the cathode 84 and the anode 96 and provides negative and positive ions to constitute capacitors at the cathode 84 and the anode 96, respectively. The electrolyte utilized in the capacitor 80 may be the same as or may differ from that utilized in the capacitor 60. The particular electrolyte chosen may depend on a number of factors, such as the desired conductivity of the electrolyte.

Figure 6:
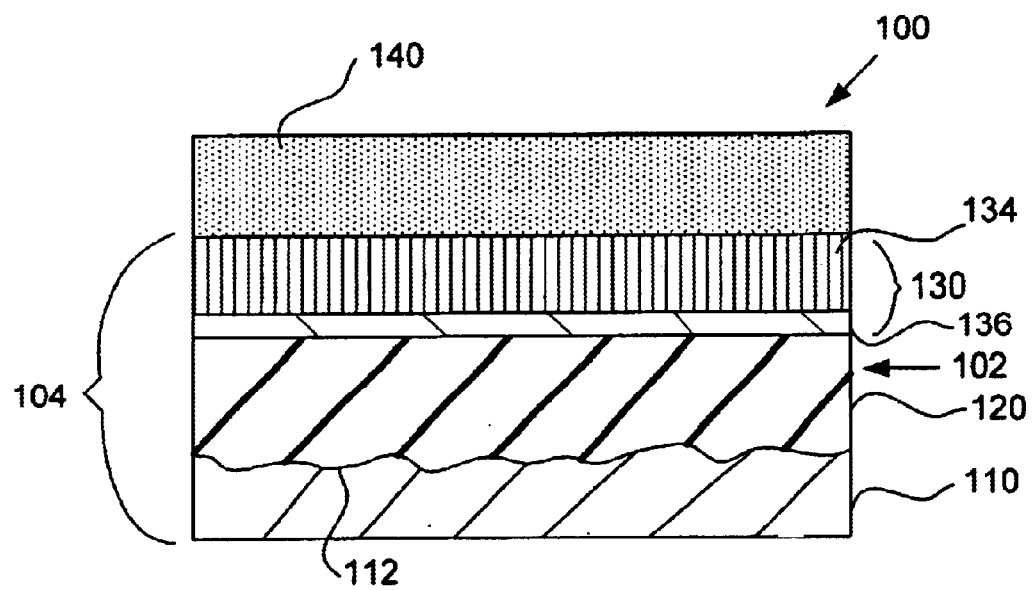
FIG. 6 is a schematic cross-sectional view of a portion of a first capacitor type according to an exemplary embodiment.
Figure 7:
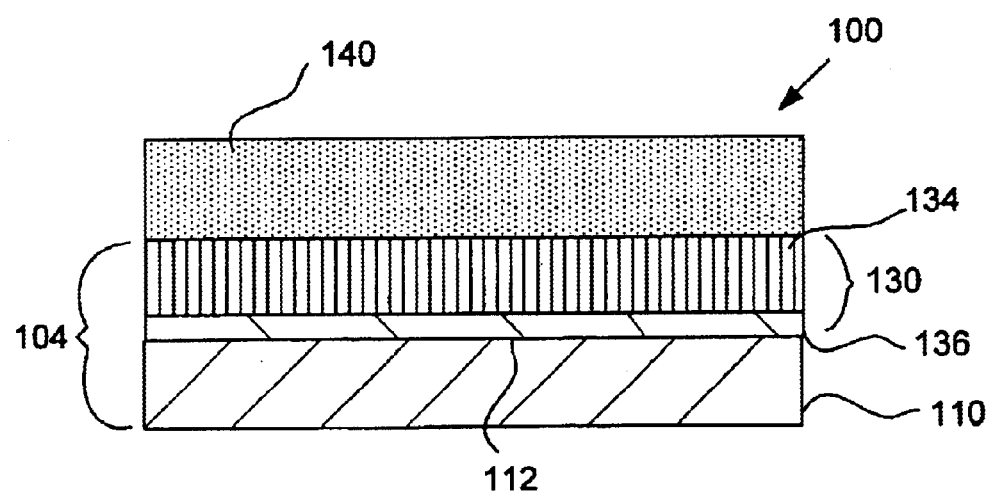
FIG. 7 is a schematic cross-sectional view of a portion of a second capacitor type according to another exemplary embodiment.

FIGS. 6 and 7 show more detailed schematic cross-sectional views of a portion 102 of an electrode 100 (e.g., a cathode or an anode) that may be utilized in a capacitor such as those shown in FIGS. 4 and 5. It should be noted that while two specific capacitor arrangements have been shown and described with respect to FIGS. 4 and 5, the electrode 100 may also be used with other types of capacitors without departing from the scope of this disclosure. Accordingly, the electrode 100 will be described herein as being configured for use with a capacitor such as an electrolytic capacitor without being restricted to the particular capacitor types shown and described herein.

As shown in FIG. 6, the electrode 100 is provided as a multilayer structure 104 and includes a substrate or base material 110 and a layer of material 130 (i.e., a carbonaceous or carbon-containing material) that acts to enhance the capacitance of the electrode 100. In this manner, the carbonaceous layer 130 may be referred to as a capacitance-enhancing layer. An electrolyte 140 is in contact with the carbonaceous layer 130 when the electrode is provided in an electrolytic capacitor (although the electrode may be utilized in other types of capacitors). As shown in FIG. 6, a carbide layer 120 may be provided intermediate or between the carbonaceous layer 130 and the substrate 110. FIG. 7 illustrates an embodiment in which a carbide layer is not provided intermediate the carbonaceous layer 130 and the substrate 110 (e.g., the carbonaceous layer 130 is provided in contact with the substrate 110).

FIG. 6 illustrates an embodiment in which the substrate 110 comprises a metal. According to an exemplary embodiment in which a metal substrate is provided, the substrate 110 may comprise a metal such as titanium, aluminum (for an anode), tantalum, niobium, zirconium, and alloys of any one or more of the foregoing metals. Where the substrate is part of a cathode, the substrate material is preferably relatively tough, weldable, and resistant to chemicals. For example, a substrate for a cathode may be titanium or a titanium alloy. In other examples, the cathode may include a substrate made of tantalum, niobium, or alloys thereof. Other materials may also be used.

Where the substrate is part of an anode, the material chosen preferably has the capability to form an anodic oxide thereon. Because such metals allow electrons generally to travel in one direction but not another (i.e., due to the interface between the metal and an oxide formed thereon), such materials may generally be referred to as valve metals. For example, a substrate for use in an anode may be tantalum, niobium, or alloys thereof. Other materials may also be used.

While any of a variety of materials may be utilized to form the metal substrate, according to a preferred embodiment in which a metal substrate is utilized, the substrate 110 is titanium or a titanium alloy (e.g., titanium or titanium alloy foil or sheet metal). According to an alternative embodiment (in an anode), the substrate is aluminum or an aluminum alloy.

According to another exemplary embodiment, the substrate 110 may instead be provided as a carbon-containing material such as a glassy carbon material (e.g., a neat glassy carbon sheet material). Such an arrangement is shown in FIG. 7, in which the substrate 110 is provided as a glassy carbon material. Such glassy carbon material may be provided as a sheet of material such as glassy carbon plates commercially available from Alfa Aesar of Ward Hill, Mass. According to an alternative embodiment, the glassy carbon material may be formed on another substrate by applying at least one coat of a suspension of glassy carbon powder, commercially available from Alfa Aesar of Ward Hill, Mass. The glassy carbon material may be provided with a carrier solvent containing a polymerizable hydrocarbon. The coated surface is then pyrolized at a temperature between approximately 800° and 1000° C. for approximately one hour in an inert atmosphere (e.g., argon or in vacuum at a pressure of about 10E-6 Torr) to yield a glassy carbon surface. Prior to pyrolization, pre-treatments such as pre-drying may be applied to the system. Other methods such as plasma coating of carbon may also be used to generate the glassy carbon layer.

Figure 10:
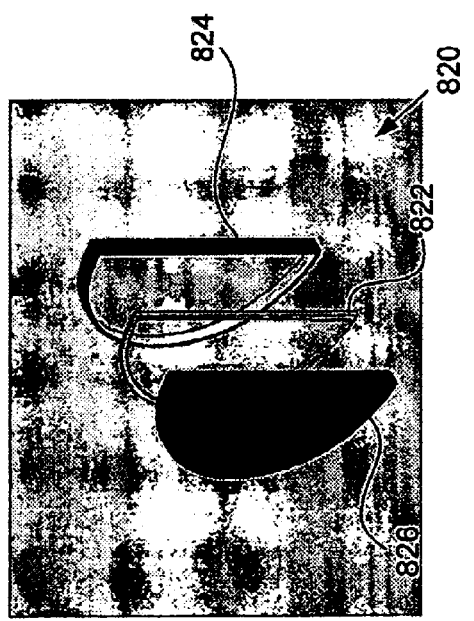
FIG. 10 is an exploded perspective schematic view of a capacitor housing including a glassy carbon portion according to another exemplary embodiment.
Figure 9:
FIG. 9 is an exploded perspective schematic view of a capacitor housing including a glassy carbon portion according to another exemplary embodiment.
Figure 8:
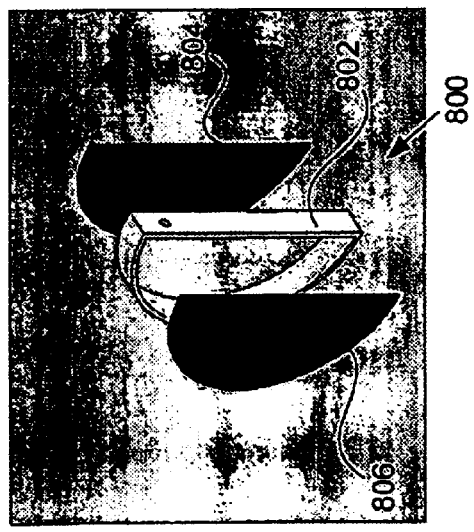
FIG. 8 is an exploded perspective schematic view of a capacitor housing including a glassy carbon portion according to an exemplary embodiment.

FIGS. 8–10 illustrate several exemplary embodiments in which a glassy carbon material is utilized as at least a portion of an electrode that at least partially defines a capacitor housing (e.g., a cathode). According to other embodiments, a glassy carbon material may be used in an electrode which does not at least partially define a capacitor housing (e.g., a cathode or anode provided within a capacitor housing). FIG. 8 shows a capacitor housing 800 comprising a metal portion 802 (e.g., a titanium wall) and two glassy carbon covers or lids 804, 806. An electrolyte and an anode may be provided within the housing 800. FIG. 9 shows a capacitor housing 810 comprising a glassy carbon case 812 and a glassy carbon cover or lid 814. An electrolyte and an anode may be provided within the housing 810. FIG. 10 shows a capacitor housing 820 comprising a metal joining ring (e.g., a titanium joining ring) and two glassy carbon housing portions (e.g., clamshell portions) 824, 826. An electrolyte and an anode may be provided within the housing 820. While three exemplary embodiments of a capacitor housing utilizing a glassy carbon substrate have been shown and described, various other embodiments may also be utilized in which at least a portion of a capacitor housing, container, or electrode are at least partially constructed of glassy carbon.

Referring again to FIGS. 6 and 7, the substrate 110 may be provided as a single layer of material or may include multiple layers of material. The various layers may have the same composition or may differ from each other (e.g., a substrate may be provided as having alternating layers of titanium and a titanium alloy or of titanium and glassy carbon). It should be noted that the materials described for the substrate 110 are not exclusive, and other metals or materials may be utilized according to alternative embodiments.

According to a preferred embodiment, the substrate 110 has a thickness of between approximately 150 and 250 micrometers. According to various alternative embodiments, the substrate may have a thickness of between approximately 50 and 500 micrometers. Thicker substrates may be utilized where the substrate 110 is provided as a glassy carbon sheet to reduce or eliminate the occurrence of brittleness of the substrate.

According to an exemplary embodiment, the substrate 110 includes a surface 112 that has a relatively rough characteristic or configuration (e.g., the surface 112 is not entirely planar or flat, and may include protrusions or extensions that extend from the surface 112 to form a surface having peaks and valleys). One nonexclusive example of such a surface is shown in FIG. 6 according to an embodiment in which a metal substrate is provided, although the precise nature of such a surface may vary according to alternative embodiments. According to a preferred embodiment, the surface 112 has a roughness of between approximately 2 and 5 micrometers (e.g., the average height or distance between the peaks and valleys is between 2 and 5 micrometers). It is intended that the roughness of the surface 112 provides for enhanced mechanical bonding between the substrate 110 and a layer of material provided in contact with the substrate 110. Chemical bonding may be utilized in addition to mechanical bonding to secure such a layer of material to the substrate 110.

According to another exemplary embodiment, the surface 112 of the substrate 110 may be provided as having a relatively smooth (e.g., flat or planar) surface finish. Such an arrangement is shown in FIG. 7 according to an embodiment in which a glassy carbon substrate is provided. In embodiments where a relatively smooth surface finish is provided, chemical bonding may play a more significant role in bonding other materials or layers to the substrate.

According to an exemplary embodiment in which substrate 110 is a metal, the substrate 110 may include a relatively thin (e.g., less than approximately 10 nanometers) native oxide layer (not shown). For example, according to a preferred embodiment in which the substrate 110 is titanium or a titanium alloy, the substrate may include a relatively thin titanium oxide layer on the surface 112 thereof. The native oxide layer may remain on the surface or may be removed in subsequent processing steps.

As shown ire FIG. 6, the carbide layer 120 is provided adjacent or proximate (e.g., in contact with) the substrate 110. While a carbide layer is not shown as being provided in FIG. 7 where a glassy carbon substrate is utilized, such a carbide layer may be provided according to alternative embodiments with a glassy carbon substrate.

According to an exemplary embodiment, the carbide layer 120 is a metal carbide comprising carbon atoms and metal atoms as provided in the adjacent substrate 110. For example, according to a preferred embodiment in which the substrate 110 is titanium, the carbide layer 120 is titanium carbide (TiC). In providing the carbide layer 120, oxygen atoms included in the native titanium oxide layer formed on the surface 112 of the substrate 110 may be displaced by carbon atoms in an elevated temperature reaction as will be described in greater detail below. According to an alternative embodiment, no carbide layer is provided (e.g., where the substrate is aluminum or an aluminum alloy, as in an anode application). According to still other alternative embodiments, an additional layer of material may be provided intermediate or between the substrate and the carbide layer.

The carbide layer 120 is bonded or coupled both chemically (e.g., is a chemisorbed layer) and mechanically (e.g., by virtue of interaction with the roughened surface 112 of the substrate 110) according to a preferred embodiment. According to an alternative embodiment, the carbide layer may be bonded by purely chemical means or by purely mechanical means to the substrate 110.

The carbide layer 120 is formed by providing a layer of carbon-containing material (e.g., graphite powder or particles with individual particle sizes of about 1 micrometer) adjacent the substrate 110. According to a preferred embodiment, the layer of carbon-containing material has a thickness of between approximately 20 and 30 micrometers and is deposited in up to 10 or more coats or layers of a graphite powder suspension in a carrier liquid. According to alternative embodiments, the layer of carbon-containing material may be provided as having a different thickness and/or may be applied in a different number of coats or layers.

To produce carbide, an elevated temperature or vacuum baking step is performed in which the carbon-containing material is subjected to a temperature of between approximately 800° and 1000° C. in a vacuum furnace at a pressure of approximately 10E-6 Torr, during which at least a portion of the carbon included in the carbon-containing material forms a metal carbide (e.g., by displacing oxygen atoms in the native oxide formed on the surface of the substrate or by reacting with metal atoms in the substrate). According to a preferred embodiment, at least a portion of the carbon-containing material is not converted to a carbide material, and remains as bulk carbon-containing material adjacent the carbide layer 120. According to an alternative embodiment, the carbon-containing material is entirely consumed in the vacuum baking step, such that no carbon-containing material is left adjacent the carbide layer. In yet another alternative embodiment, the vacuum baking step may be replaced with an elevated temperature process performed in an inert (e.g., argon) atmosphere.

According to a preferred embodiment, the thickness of the carbide layer 120 is less than approximately 10 nanometers. According to alternative embodiments, the thickness of the carbide layer may be greater than 10 nanometers (e.g., between approximately 10 and 500 nanometers).

The carbonaceous layer 130 is provided adjacent or proximate the carbide layer 120 (or adjacent or proximate the substrate where no carbide layer is provided, e.g., as shown in FIG. 7), and provides enhanced capacitance for the electrode 100. The carbonaceous layer 130 includes activated carbon (formed from the carbon-containing material provided adjacent the carbide layer 120 or from carbon-containing material provided adjacent the substrate 110 where no carbide layer is provided) and a capacitance-enhancing material. The carbonaceous layer may also include unreacted (e.g., non-activated) carbon-containing material intermediate or between the activated carbon and the carbide layer (or substrate where a carbide layer is not provided). According to an alternative embodiment, the carbon provided in the carbonaceous layer is not activated, and instead includes unreacted carbon (e.g., graphite) and a capacitance-enhancing material.

As described above, according to a preferred embodiment, a portion of the carbon-containing material remains adjacent the carbide layer after the vacuum baking step that converts a portion of the carbon-containing layer to a metal carbide material. According to other embodiments, additional carbon-containing material (either the same as or different from the carbon-containing material used to form the carbide layer) may be provided. For example, where a carbide layer is not provided adjacent the substrate, carbon-containing material may be provided adjacent the substrate to form the carbonaceous layer 130.

The carbon-containing material used to form the carbonaceous layer 130 is cooled to a temperature of between approximately 20° and 100° C. and then heated in an oxygen-containing atmosphere or ambient (e.g., air, pure oxygen, etc.) to a temperature of between approximately 400° and 450° C. for a period of between approximately 30 and 90 minutes. This heating step forms an activated carbon region or layer 134 in the carbonaceous layer 130 by forming functional groups that include oxygen. For example, the activated carbon region 134 may include oxygen-containing functional groups such as CO, COOH, and C=O.

The activated carbon region 134 exhibits increased porosity as compared to the carbon-containing material from which it is formed, which allows liquid electrolyte to penetrate at least a portion of the carbonaceous layer 130. One advantageous feature of providing an activated carbon region 134 is that the surface area of the carbonaceous layer 130 is increased, which in turn acts to increase the capacitance of the electrode 100.

The thickness of the activated carbon region 134 is a function of the amount of time that elapses during the elevated temperature activation process. According to a preferred embodiment, the thickness of the carbonaceous layer 130 is between approximately 10 and 50 micrometers, and the thickness of the activated carbon region 134 is between approximately 5 and 25 micrometers after activating the carbon-containing material at a temperature of approximately 450° C. for a period of approximately 0.5 hours. A layer 136 of unreacted (e.g., non-activated) carbon-containing material remains intermediate or between the activated carbon region 134 and the carbide layer 120 (or the substrate 110 where a carbide layer is not provided). According to another embodiment, the activated carbon portion of the carbonaceous layer extends entirely through the carbonaceous layer such that substantially all of the carbon-containing material is converted to activated carbon.

The carbonaceous layer 130 also includes a capacitance-enhancing material that acts to increase the capacitance (e.g., the specific capacitance) of the electrode 100. Various types of capacitance-enhancing materials may be provided according to various exemplary embodiments. The capacitance-enhancing material may be provided as a layer of material above the activated carbon region 134. At least a portion of the capacitance-enhancing material may infiltrate or be embedded in at least a portion of the activated carbon region 134 according to an exemplary embodiment. According to alternative embodiments, all of the capacitance-enhancing material may be embedded in at least a portion of the activated carbon region 134 or all of the capacitance-enhancing material may be provided as a layer of material which does not infiltrate the activated carbon region 134. The carbonaceous layer 130 is shown as a single layer, although it may be provided as multiple layers (e.g., an unreacted carbon region, an activated carbon region, and a layer of capacitance-enhancing material).

According to one exemplary embodiment, the capacitance-enhancing material comprises carbon nanotubes or nanofibers (e.g., single- or multi-walled carbon nanotubes). A carbon nanotube is characterized by a hollow core and one or more layers of graphitic carbon arranged concentrically around the central longitudinal axis of the tube. According to an exemplary embodiment, the carbon nanotubes have diameters that are less than approximately one micrometer (e.g., 0.1 micrometers or less) and have a length to diameter ratio of at least five. According to a preferred embodiment, the carbon nanotubes have an average diameter of between about 80 and 120 nanometers and a length to diameter ratio of greater than approximately 10.

The carbon nanotubes may be provided as a relatively porous layer of carbon nanotubes, and may be activated (e.g., may have oxygen-containing functional groups) or may be non-activated. The relatively porous layer of carbon nanotubes advantageously exhibits a relatively constant pore size of between approximately 50 and 150 nanometers.

It is intended that the use of carbon nanotubes enhances the capacitance as a function of frequency of the electrode by providing a relatively constant pore size material to the carbonaceous layer. One advantageous feature of utilizing carbon nanotubes is that such a material adheres to the activated carbon region 134 after a brief activation of the nanotube layer at a temperature of between approximately 400° and 450° C. in an oxygen-containing atmosphere, without the need for additional adhesive agents or additional processing steps (e.g., activated carbon nanotubes are self-adhesive to each other and with an underlying carbon-containing material such as that included in the activated carbon region 134).

Any of a variety of methods may be utilized to prepare the carbon nanotubes. For example, the carbon nanotubes may be produced by the catalytic decomposition of hydrocarbons. In another example, the carbon nanotubes may be arc-grown carbon nanotubes. According to a preferred embodiment, the carbon nanotubes are produced by growing the carbon nanotubes utilizing a plasma reactor. According to another exemplary embodiment, the carbon nanotubes may be purchased commercially.

According to another exemplary embodiment, carbon nanotubes may be provided in a suspension with water and/or another solvent (e.g., alcohol) and heated to evaporate the solvent and adhere the carbon nanotubes to the activated carbon layer. For example, a suspension of carbon nanotubes may be deposited over an unreacted carbon layer and both the unreacted carbon layer and the carbon nanotube suspension may be heated (e.g., in an oxygen-containing atmosphere). Such heating may act to activate at least a portion of the carbon in the unreacted carbon layer, pyrolize the solvent, adhere the carbon nanotubes to the activated carbon, and activate at least a portion of the carbon nanotubes. Alternatively, the carbon nanotubes may be provided over an activated carbon layer rather than an unreacted carbon layer.

According to yet another exemplary embodiment, the carbon nanotubes may be directionally grown by a process known as microwave plasma enhanced chemical vapor deposition (see, e.g., "Plasma induced alignment of carbon nanotubes," Applied Physics Letters, 7(6), pp. 830–832). The carbonaceous surface to be coated with directionally grown carbon nanotubes is placed into a chamber and heated to about 800° C. in a protective atmosphere. The chamber is then flooded with a carbon carrier gas such as methane or acetylene and about 1 kW of microwave power is used to irradiate the surface in order to generate a plasma at the sample surface, which initiates the growth of the carbon nanotubes at the surface. The method may utilize a pretreatment of the surface with a catalyst such as iron, cobalt, or other acceptable catalysts.

According to another exemplary embodiment, the capacitance-enhancing material is a metal oxide (e.g., an electronically-conductive metal oxide). The metal oxide may be provided in a suspension or solution comprising at least one of graphite, water, and an alcohol (e.g., methanol, isopropanol, etc.).

The metal oxide may include oxides of any metal included in one or more of Group VII and Group VIII of the periodic table. For example, the metal oxides may include ruthenium dioxide ($RuO_2$), iridium dioxide ($IrO_2$), manganese dioxide ($MnO_2$), silver vanadium oxide ($Ag_2V_4O_{11}$), vanadium pentoxide ($V_2O_5$), titanium dioxide ($TiO_2$), rhenium dioxide ($ReO_2$), osmium dioxide ($OsO_2$), molybdenum dioxide ($MoO_2$), rhodium dioxide ($RhO_2$), vanadium dioxide ($VO_2$), and tungsten dioxide ($WO_2$). The metal oxide may include one or more of these types of oxides and/or may include other metal oxides comprising metals in at least one of Group VII and Group VIII of the periodic table.

It has been found that the capacitance-enhancing effect and the mechanical adherence between the metal oxide and the activated carbon increase with decreasing metal oxide particle size. According to an exemplary embodiment, the metal oxide particles have an average particle size of between approximately 0.5 and 1.0 micrometers. According to other exemplary embodiments, the particle size of the metal oxide may be between approximately 0.1 and 2.0 micrometers.

The metal oxide may be provided as precipitate from a sol-gel suspension in which colloidal particles or molecules in suspension (a sol) are mixed with a liquid that causes them to join together into a gel. This process is known to deliver small particle sizes below 1 micron. The particles precipitated from the sol-gel may be used to form a suspension, which may be coated onto the carbonaceous layer using any of a variety of methods, including dipping, draining, spinning, and spraying. According to a preferred embodiment, a sol-gel particle suspension including $RuO_2$ particles with particle sizes below 1 micron and graphite powder particles with sizes of approximately 1 micron is applied to the carbonaceous layer by spray coating.

The metal oxide material may be provided using any suitable method or mechanism. According to an exemplary embodiment, the metal oxide may be provided in a sputtering process (e.g., a reactive sputtering process). For example, a target material (e.g., a ruthenium or iridium target) may have a relatively high-energy beam of $Ar^+$ ions applied thereto in an oxygen-containing atmosphere, which results in the deposition of a metal oxide adjacent the activated carbon layer.

According to another exemplary embodiment, the metal oxide may be deposited over the activated carbon region 134 in a suspension that includes the metal oxide and a carrier liquid (e.g., water and/or an alcohol such as methanol, isopropanol, etc.), after which the carrier liquid is pyrolized or evaporated in an elevated temperature process.

According to another exemplary embodiment, a metal oxide precursor may be provided and heated to produce the metal oxide (e.g., in an oxygen-containing atmosphere). Any of a variety of metal-oxide precursors may be utilized, including but not limited to ruthenium chloride ($RuCl_3$), iridium chloride ($IrCl_3$), chromium chloride ($CrCl_3$), molybdenum trioxide ($MoO_3$), osmium plus sodium permanganate ($Os+NaMnO_4 \cdot XH_2O$), and tungsten plus tungsten trioxide+iodine ($W+WO_3+I_2$). According to various other embodiments, other metal oxide precursors may be utilized.

The metal oxide precursor may be provided in a suspension or solution comprising the metal oxide precursor material at least one of water, alcohol, and graphite. According to an exemplary embodiment, the metal oxide precursor may be provided in a solution having between approximately 1 and 10 volume percent precursor, between approximately 0 and 100 volume percent water, between approximately 0 and 100 volume percent alcohol, and between approximately 0 and 10 weight percent graphite powder. The particular composition of the solution may differ in various other embodiments, and may be chosen based on a variety of factors.

The temperature and duration of the heating step used to convert the metal oxide precursor to a capacitance-enhancing metal oxide may vary depending on a number of factors, including the type of precursor utilized. According to one exemplary embodiment, the metal oxide precursor is $RuCl_3$ and is provided as a 5 weight percent solution in iso-propyl alcohol. According to another exemplary embodiment, the metal oxide precursor is $IrCl_3$ and is provided as a 5 weight percent solution in water.

It should also be noted that more than one type of capacitance-enhancing material may be utilized. For example, both carbon nanotubes and a conductive metal oxide may be provided adjacent or proximate the substrate and/or a carbide layer.

Figure 13:
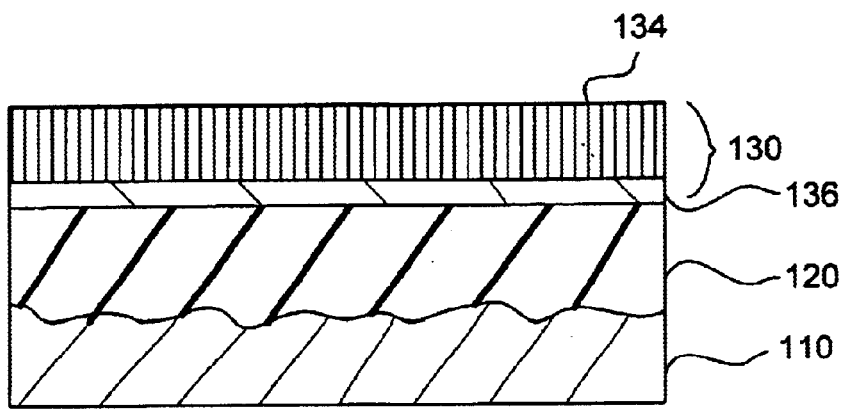
FIG. 13 is a schematic cross-sectional view of the portion of the capacitor shown in FIG. 6 showing a capacitance-enhancing layer formation step.
Figure 14:
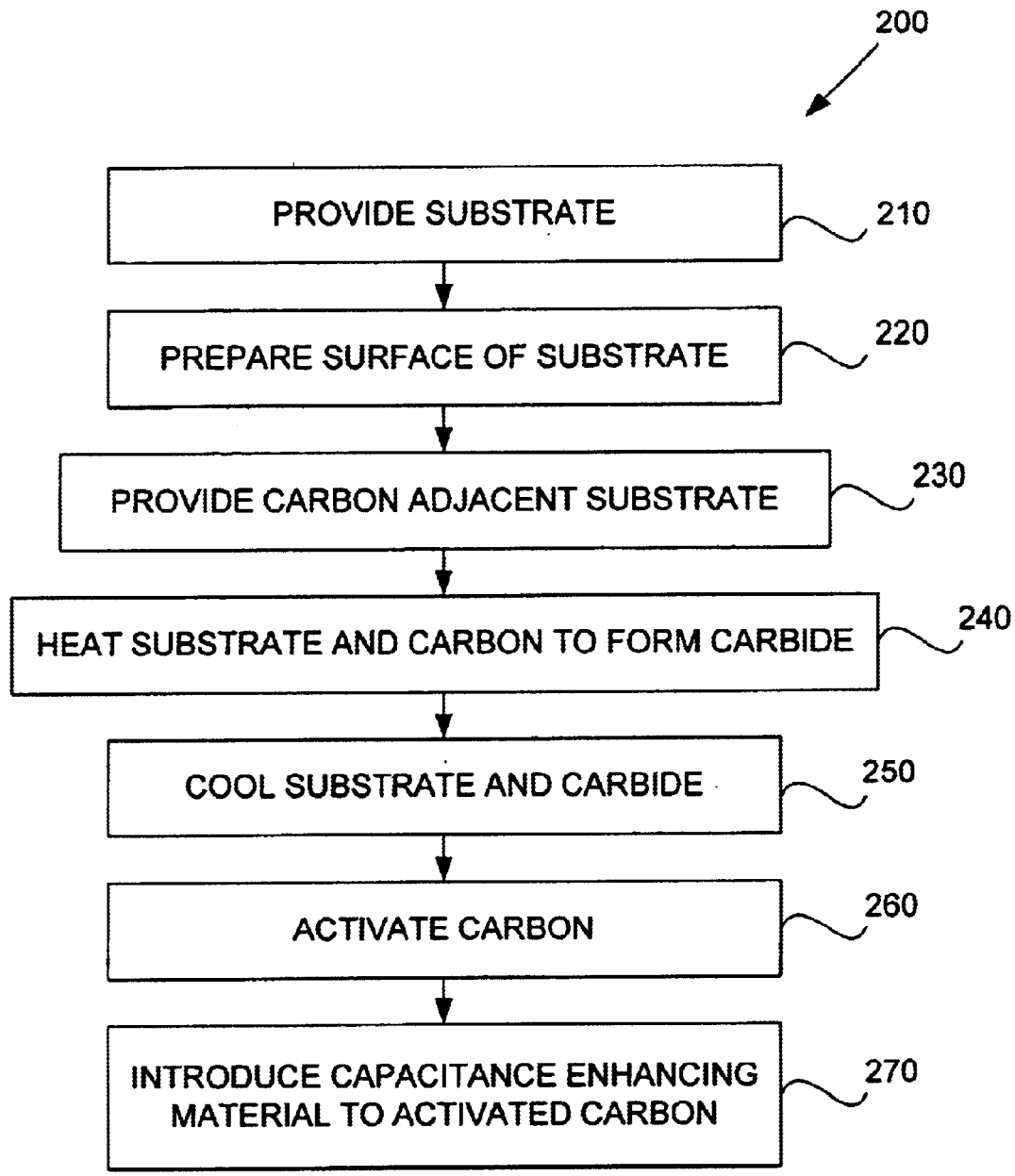
FIG. 14 is a flow diagram illustrating a process for forming the portion of the capacitor shown in FIG. 6.

A method or process 200 of producing the electrode 100 shown in FIG. 6 is now described with reference to FIGS. 11–13. A flow diagram illustrating such a method or process 200 is provided as FIG. 14. As described above, FIG. 7 does not include a carbide layer, and therefore various processing steps may be omitted in producing an electrode in accordance with the embodiment shown in FIG. 7. Such omissions will be described in conjunction with the following description.

Figure 11:
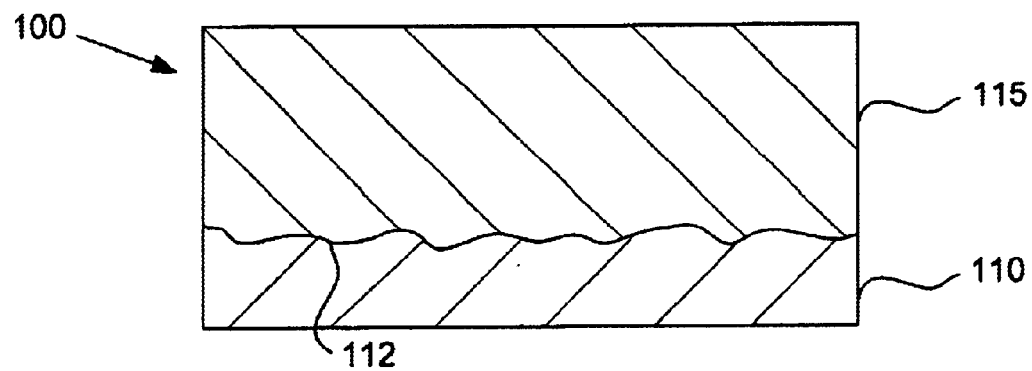
FIG. 11 is a schematic cross-sectional view of the portion of the capacitor shown in FIG. 6 showing a layer of carbon provided over a substrate.

As shown in FIG. 11, the substrate 110 is provided in a step 210. According to an exemplary embodiment, the substrate 110 is titanium or a titanium alloy and is provided as a foil or sheet of metal. According to other embodiments, any of a variety of metals and/or metal alloys may be used to form the substrate, such as aluminum (for an anode), tantalum, niobium, zirconium, silver, and alloys thereof. According to another embodiment such as that shown in FIG. 7, the substrate may comprise a glassy carbon material.

In a step 220, a surface 112 of the substrate 110 is altered or deformed to have a relatively rough characteristic or configuration. In some cases, it may be desirable not to deform or roughen the substrate, such as in an embodiment in which a glassy carbon substrate is provided. In such a case, step 220 may be omitted.

Various methods may be used to provide the surface 112 with its relatively rough surface finish. For example, according to an exemplary embodiment, a grit blasting technique may be utilized to alter the surface 112. The grit may be alumina ($Al_2O_3$) or silicon carbide (SiC) having a particle diameter of about 1 micrometer. The grit may be accelerated using compressed air at between approximately 20 and 40 psi.

According to another exemplary embodiment, an etching process may be utilized to provide the surface 112 with a relative surface finish. For example, oxalic acid may be utilized at a temperature of approximately 80° C.

According to another exemplary embodiment, the substrate may be provided with a roughened surface without the need to perform a separate processing step. For example, sintered metal particles (e.g., sintered titanium) may be deposited on a metal sheet surface (e.g., a titanium sheet) using a vacuum sintering process.

In a step 230, a carbon layer 115 (e.g., a layer of carbon-containing material) is provided adjacent at least a portion of the substrate 110. According to a preferred embodiment, the carbon material may be provided as a suspension of carbon or graphite powder in alcohol (e.g., methanol, isopropanol, etc.). Higher polymerizable alcohol varieties may also be utilized. Thus, the carbon material may be provided in either a polymerizable or non-polymerizable form. According to an alternative embodiment, the carbon layer may be provided as a polymeric micro-porous foam material which is subsequently pyrolized. Step 230 may be omitted according to an embodiment in which a glassy carbon substrate is utilized.

The carbon layer 115 may be deposited or provided by any suitable means. According to a preferred embodiment, the carbon layer 115 may be provided using a spray gun or a similar device. Other methods for providing the carbon layer 115 may also be used according to alternative embodiments (e.g., sputtering, e-beam evaporation or other physical deposition methods, chemical vapor deposition, etc.). The particular deposition method may be chosen based on a variety of factors, including cost, manufacturability, and desired characteristics for the deposited material.

According to another exemplary embodiment in which a polymeric micro-porous foam material is utilized, the foam material may be provided by depositing the foam material adjacent the substrate and pyrolizing the foam material to provide a layer of carbon-containing material (e.g., using a vacuum furnace at a temperature of between approximately 800° and 1000° C. and a pressure of approximately 10E-6 Torr). Such resulting carbon-containing material is relatively porous, and therefore has relatively high surface area. One example of a polymeric micro-porous foam material is available under the trade name Carbon Aerogel and is commercially available from Marketech International, Inc. of Port Townsend, Wash.

According to a preferred embodiment, the carbon layer 115 includes graphite particles having particle sizes of approximately 1 micrometer (e.g., between approximately 0.1 and 2 micrometers). One nonexclusive example of such material is commercially available as a graphite, colloidal, lubricant, aerosol spray by Alfa Aesar of Ward Mill, Mass. The carbon material is provided as a suspension of graphite in isopropanol. According to alternative embodiments, other types of alcohol may be used in place of or in addition to isopropanol.

According to an exemplary embodiment, the carbon layer 115 includes multiple layers of carbon-containing material that are deposited in multiple deposition steps. For example, the carbon layer 115 may include between 3 and 20 layers of carbon-containing material and may have a thickness of between approximately 20 and 30 micrometers. The number of layers and the thickness of the carbon layer may vary according to a variety of alternative embodiments.

Figure 12:
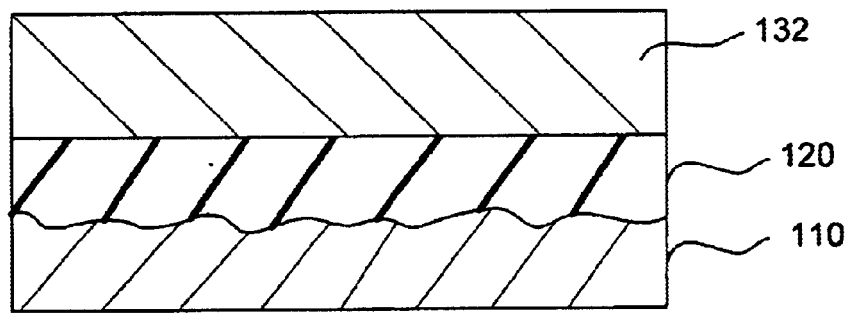
FIG. 12 is a schematic cross-sectional view of the portion of the capacitor shown in FIG. 6 showing a carbide formation step.

In FIG. 12, in a step 240 (which may be omitted where a glassy carbon substrate is utilized), a carbide layer 120 is formed. The substrate 110 and the carbon layer 115 are heated to a temperature of between approximately 800° and 1000° C. at a pressure of approximately 10E-6 Torr for approximately 1 hour (e.g., between approximately 30 and 90 minutes). During this vacuum baking step, alcohol provided with the carbon-containing material is evaporated and/or pyrolized. At least a portion of the carbon atoms included in the layer of carbon material 115 chemically react with metal atoms to form a carbide layer 120. For example, according to a preferred embodiment in which the substrate is made of titanium, a titanium carbide layer is formed during the vacuum baking step. The carbon atoms may displace oxygen atoms in the native oxide formed on the surface of the substrate and/or may react with metal atoms included in the substrate. Where the substrate is provide as aluminum or an aluminum alloy, the vacuum baking step may be omitted.

The thickness of the carbide layer 120 may at least in part be determined by the amount of time the substrate 110 and carbon layer 115 are heated in the vacuum baking step. According to an exemplary embodiment, only a portion of the carbon layer 115 is consumed during the vacuum baking step, and a layer of unreacted carbon 132 remains adjacent the carbide layer 120. According to an alternative embodiment, the entire carbon layer 115 is consumed in the vacuum baking step and another layer of carbon-containing material may be provided adjacent the carbide layer. The additional layer of carbon-containing material may have a composition which is the same as or different from that of the carbon material used to form the carbide layer.

In a step 250, the substrate 110, the carbide layer 120, and the unreacted carbon layer 132 are cooled to a temperature of between approximately 20° and 100° C.

According to an embodiment such as that shown in FIG. 7 in which a glassy carbon substrate is utilized, a layer of carbon-containing material is provided adjacent the substrate. This layer of carbon material is used in place of the unreacted carbon layer 132 described with respect to FIG.

12. The unreacted (e.g., non-activated) carbon-containing material is used in the formation of a carbonaceous layer 130.

In a step 260 shown in FIG. 9, the carbonaceous layer 130 is formed. To form the carbonaceous layer 130, the various electrode materials (e.g., the substrate 110, carbide layer 120, and unreacted carbon layer 132) are heated in a step 260 (FIG. 9) to a temperature of between approximately 300° and 500° C. in an oxygen-containing ambient or atmosphere (e.g., air, pure oxygen, etc.) for a period of between approximately 30 and 90 minutes. At least a portion of the unreacted carbon layer 132 is activated such that oxygen-containing functional groups such as CO, COOH, and C=O are created to form an activated carbon region (e.g., activated carbon region 134). An unreacted carbon region 136 remains adjacent the activated carbon region 134 where the entirety of the unreacted carbon layer 132 is not converted to activated carbon. According to an alternative embodiment, all of the carbon-containing material in unreacted carbon layer 132 is converted to activated carbon (e.g., unreacted carbon region 136 is omitted).

Where a glassy carbon substrate is used in conjunction with a layer of carbon-containing material, these materials may be heated in a manner similar to that described with respect to the electrode shown in FIG. 6. For example, the unreacted carbon-containing material may be converted to a carbonaceous layer that includes activated carbon and unreacted carbon-containing material. To simplify the discussion, the remaining processing steps for the glassy carbon substrate electrode will be described with reference to the carbonaceous layer 130.

The relative thicknesses of the activated carbon region 134 and the unreacted carbon region 136 are a function of the amount of time that elapses during the activation step. According to an exemplary embodiment, the thickness of the activated layer is between approximately 5 and 25 micrometers after heating at approximately 450° C. for approximately 30 minutes.

In a step 270, a capacitance-enhancing material is applied to the activated carbon region 134. Because the activated carbon region 134 is relatively porous, some or all of the capacitance-enhancing material may penetrate into at least a portion of the carbonaceous layer 130 (e.g., at least a portion of the carbonaceous material 130 may be infiltrated with the capacitance-enhancing material). In this manner, the capacitance-enhancing material may be in contact with at least a portion of the carbonaceous layer 130 (e.g., as coated on the surface of and/or within the pores of the activated carbon region 134). According to another exemplary embodiment, substantially all of the capacitance-enhancing material is provided adjacent the activated carbon layer without infiltrating the activated carbon layer (e.g., a layer of carbon nanotubes may be provided in contact with a surface of the activated carbon layer without infiltrating the pores of the activated carbon layer).

Any of a variety of methods may be used to provide the capacitance-enhancing material adjacent and/or in contact with the activated carbon material, as described above. The particular method chosen may depend on the type of capacitance-enhancing material utilized. For example, in a case where a metal oxide precursor (e.g., a metal chloride) is provided, the precursor may be heated in an oxygen-containing atmosphere to produce a conductive metal oxide.

It is intended that the use of a capacitance-enhancing material in conjunction with the activated carbon material will enhance or increase the capacitance for the electrode 100 relative to conventional electrodes that do not utilize such an arrangement. According to an exemplary embodiment, the capacitance of the electrode 100 is greater than approximately 10 milliFarads per square centimeter.

According to another exemplary embodiment, the capacitance of the electrode 100 is greater than approximately 20 milliFarads per square centimeter.

As utilized herein, the terms "approximately," "about," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The construction and arrangement of the elements of the capacitor as shown in the preferred and other exemplary embodiments is illustrative only. Although only a few embodiments of the present inventions have been described in detail in this disclosure, those skilled in the art who review this disclosure will readily appreciate that many modifications are possible without materially departing from the novel teachings and advantages of the subject matter recited in the claims. Accordingly, all such modifications are intended to be included within the scope of the present invention as defined in the appended claims. The order or sequence of any process or method steps may be varied or resequenced according to alternative embodiments. Materials or layers that are "adjacent" or "proximate" each other may be in contact with each other or may be separated by another material or layer, or by a plurality at such materials or layers. Other substitutions, modifications, changes and omissions may be made in the design, operating conditions and arrangement of the preferred and other exemplary embodiments without departing from the scope of the present invention as expressed in the appended claims.

What is claimed is:

1. An electrode for a capacitor comprising:

a substrate comprising at least one of glassy carbon and a metal;

an activated carbon material adjacent the substrate, the activated carbon layer comprising oxygen-containing functional groups; and a material provided in contact with the activated carbon material for providing enhanced capacitance for the electrode.

2. The electrode of claim 1, wherein the substrate comprises at least one of titanium, aluminum, tantalum, niobium, and zirconium.

3. The electrode of claim 2, wherein the substrate comprises titanium.

4. The electrode of claim 1, wherein the activated carbon material includes a plurality of pores and at least a portion of the material provided in contact with the activated carbon material is provided within the plurality of pores.

5. The electrode of claim 1, wherein at least a portion of the material provided in contact with the activated carbon material is embedded within the activated carbon material.

6. The electrode of claim 1, wherein the material provided in contact with the activated carbon material comprises carbon nanotubes.

7. The electrode of claim 1, wherein the material provided in contact with the activated carbon material comprises a conductive metal oxide.

8. The electrode of claim 7, wherein the conductive metal oxide is provided in suspension with a graphite material.

9. The electrode of claim 7, wherein the conductive metal oxide is provided as micrometer-sized particles.

10. The electrode of claim 7, wherein the material provided in contact with the activated carbon material comprises an oxide of at least one metal from at least one of Group VII and Group VIII of the periodic table.

11. The electrode of claim 10, wherein the oxide is selected from the group consisting of ruthenium dioxide, iridium dioxide, manganese dioxide, silver vanadium oxide, vanadium pentoxide, titanium dioxide, rhenium dioxide, osmium dioxide, molybdenum dioxide, rhodium dioxide, vanadium dioxide, and tungsten dioxide.

12. The electrode of claim 1, further comprising a carbide layer intermediate the activated carbon material and the substrate.

13. The electrode of claim 12, wherein the carbide layer comprises titanium carbide.

14. The electrode of claim 12, wherein the carbide layer is chemisorbed on a surface of the substrate.

15. The electrode of claim 1, wherein the electrode is a cathode for an electrolytic capacitor.

16. The electrode of claim 1, wherein the electrode has a capacitance of greater than approximately 20 milliFarads per square centimeter.

17. An electrode for an electrolytic capacitor comprising:
a substrate comprising at least one of titanium and glassy carbon; and
a carbonaceous layer adjacent the substrate;
wherein the carbonaceous layer includes an activated carbon region and a capacitance-enhancing material provided adjacent the activated carbon region.

18. The electrode of claim 17, further comprising a carbide material provided intermediate the substrate and the carbonaceous layer.

19. The electrode of claim 18, wherein the substrate comprises titanium.

20. The electrode of claim 17, wherein the capacitance-enhancing material comprises at least one of carbon nanotubes and a conductive metal oxide.

21. The electrode of claim 20, wherein the capacitance-enhancing material comprises carbon nanotubes.

22. The electrode of claim 20, wherein the capacitance-enhancing material comprises a conductive metal oxide selected from the group consisting of ruthenium dioxide, iridium dioxide, manganese dioxide, silver vanadium oxide, vanadium pentoxide, titanium dioxide, rhenium dioxide, osmium dioxide, molybdenum dioxide, rhodium dioxide, vanadium dioxide, and tungsten dioxide.

23. The electrode of claim 17, wherein the carbonaceous layer further comprises non-activated carbon-containing material.

24. The electrode of claim 17, wherein the electrode has a capacitance of greater than approximately 20 milliFarads per square centimeter.

25. An electrode for a capacitor comprising:
a substrate comprising at least one of glassy carbon and a metal;
an activated carbon material adjacent the substrate; and
carbon nanotubes provided adjacent the activated carbon material;
whereby the activated carbon material and the carbon nanotubes provide enhanced capacitance for the electrode.

26. The electrode of claim 25, wherein the carbon nanotubes are single-walled carbon nanotubes.

27. The electrode of claim 25, wherein the carbon nanotubes are multi-walled carbon nanotubes.

28. The electrode of claim 25, wherein the substrate comprises at least one of titanium, aluminum, tantalum, niobium, and zirconium.

29. The electrode of claim 28, wherein the substrate comprises titanium.

30. The electrode of claim 25, further comprising a conductive metal oxide adjacent the activated carbon material.

31. The electrode of claim 30, wherein the conductive metal oxide comprises at least one of ruthenium dioxide, iridium dioxide, manganese dioxide, silver vanadium oxide, vanadium pentoxide, titanium dioxide, rhenium dioxide, osmium dioxide, molybdenum dioxide, rhodium dioxide, vanadium dioxide, and tungsten dioxide.

32. The electrode of claim 25, further comprising a carbide layer intermediate the activated carbon material and the substrate.

33. The electrode of claim 25, wherein the electrode is a cathode for an electrolytic capacitor.

34. The electrode of claim 25, wherein the electrode has a capacitance of greater than approximately 20 milliFarads per square centimeter.

35. An electrode for a capacitor comprising:
a substrate comprising at least one of glassy carbon and a metal;
an activated carbon material adjacent the substrate; and
an electronically conductive metal oxide provided adjacent the activated carbon material;
whereby the activated carbon material and the electronically conductive metal oxide provide enhanced capacitance for the electrode.

36. The electrode of claim 35, wherein the conductive metal oxide is an oxide of one or more metals included in at least one of Group VII and Group VIII of the periodic table.

37. The electrode of claim 35, wherein the conductive metal oxide comprises at least one of ruthenium dioxide, iridium dioxide, manganese dioxide, silver vanadium oxide, vanadium pentoxide, titanium dioxide, rhenium dioxide, osmium dioxide, molybdenum dioxide, rhodium dioxide, vanadium dioxide, and tungsten dioxide.

38. The electrode of claim 35, wherein the conductive metal oxide is provided as a sol-gel material.

39. The electrode of claim 35, wherein the conductive metal oxide is provided in a suspension with a graphite material.

40. The electrode of claim 35, wherein the conductive metal oxide has a particle size between approximately 0.1 and 2.0 micrometers.

41. The electrode of claim 35, wherein the substrate comprises at least one of titanium, aluminum, tantalum, niobium, and zirconium.

42. The electrode of claim 41, wherein the substrate comprises titanium.

43. The electrode of claim 35, wherein the activated carbon material includes a plurality of pores and at least a portion of the electronically conductive metal oxide is provided within the plurality of pores.

44. The electrode of claim 35, further comprising carbon nanotubes adjacent the activated carbon material.

45. The electrode of claim 35, further comprising a carbide layer intermediate the activated carbon material and the substrate.

46. The electrode of claim 35, wherein the electrode is a cathode for an electrolytic capacitor.

47. The electrode of claim 35, wherein the electrode has a capacitance of greater than approximately 20 milliFarads per square centimeter.

* * * * *